April 1, 1930.　　　J. W. SNARRY　　　1,753,096
METAL CUTTING AND GRINDING MACHINE
Filed Oct. 5, 1926　　　5 Sheets-Sheet 1
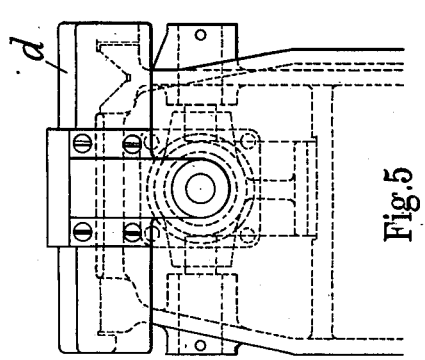
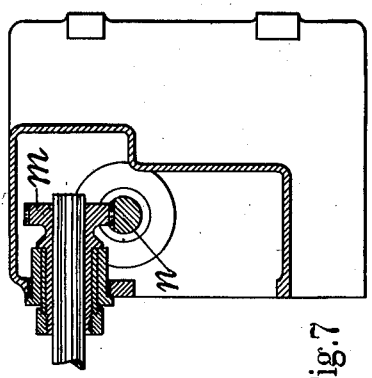
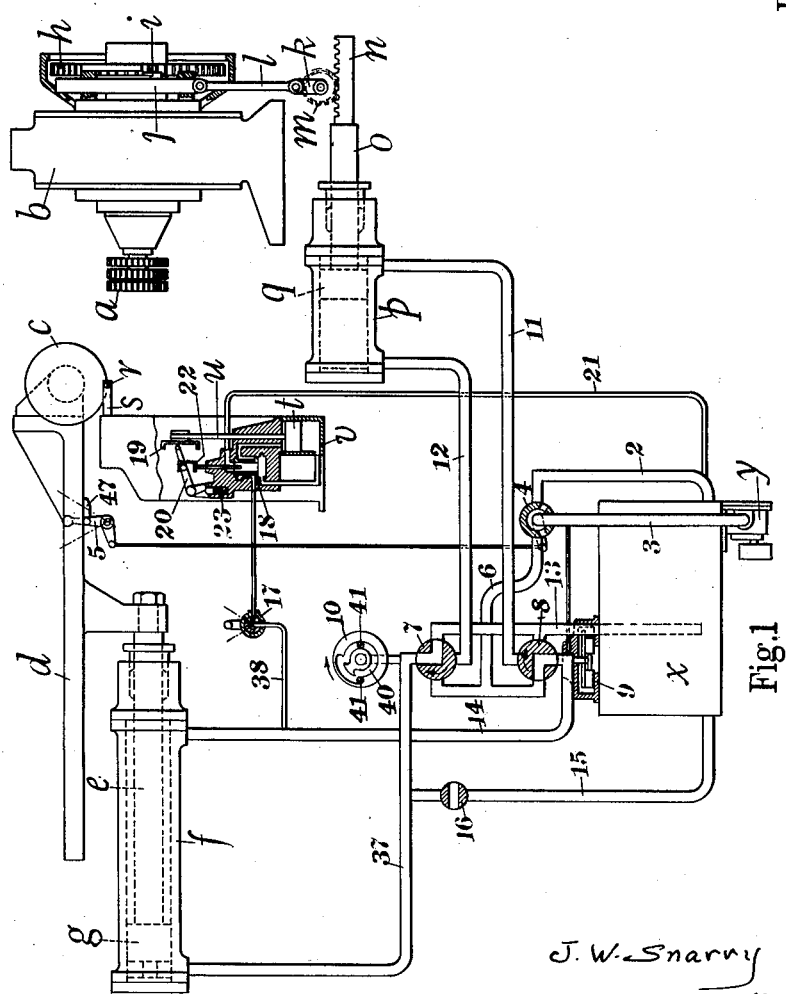
J. W. Snarry
Inventor
By: Marks & Clerk
Attys.

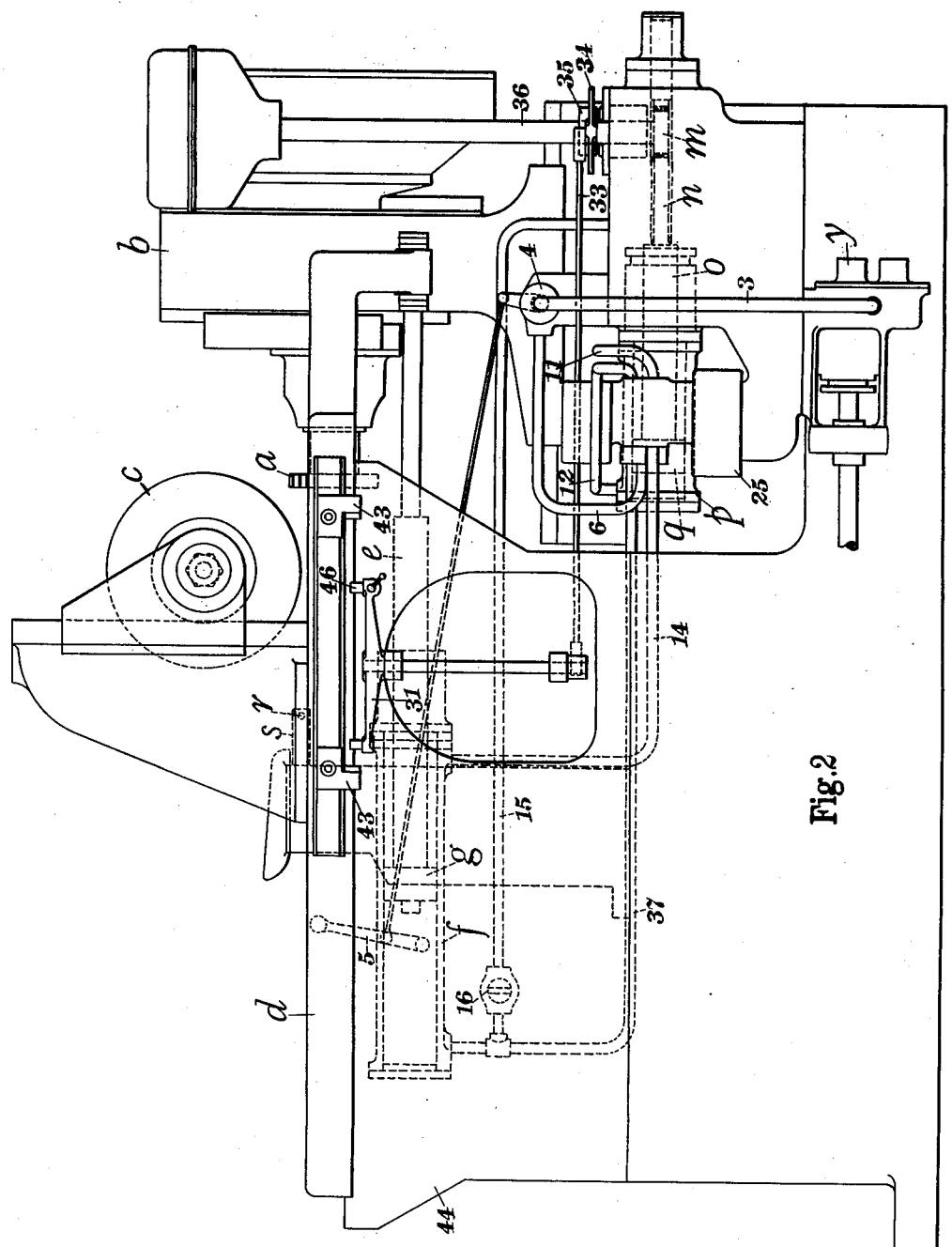

April 1, 1930.    J. W. SNARRY    1,753,096
METAL CUTTING AND GRINDING MACHINE
Filed Oct. 5, 1926    5 Sheets-Sheet 4
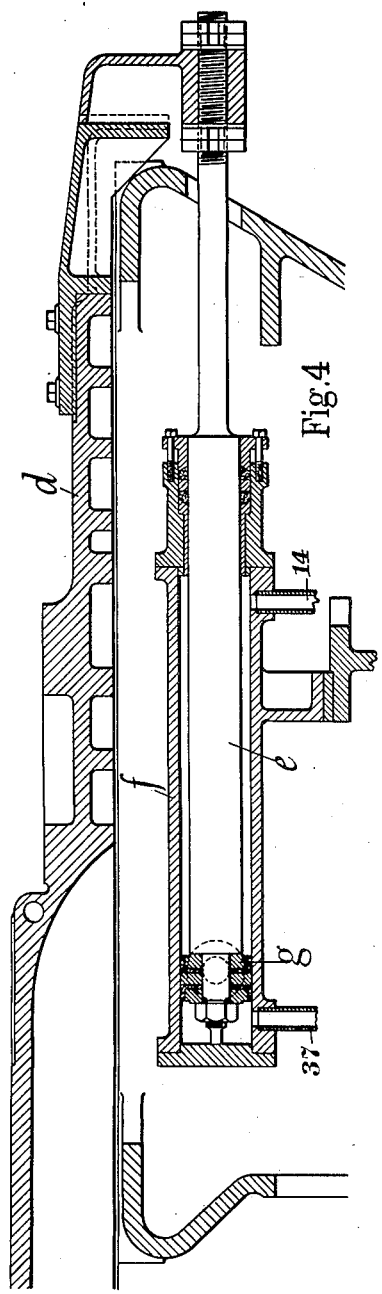
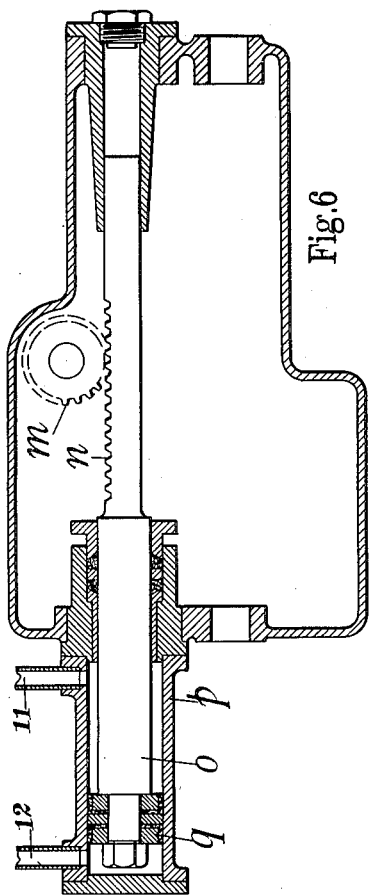
J. W. Snarry, Inventor
By: Marks & Clerk, Attys.

April 1, 1930. J. W. SNARRY 1,753,096
METAL CUTTING AND GRINDING MACHINE
Filed Oct. 5, 1926 5 Sheets-Sheet 5
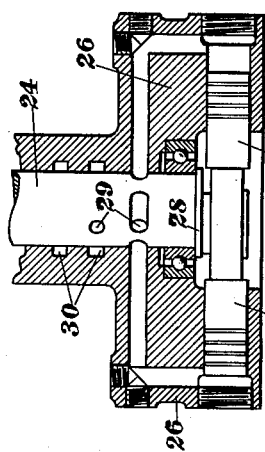
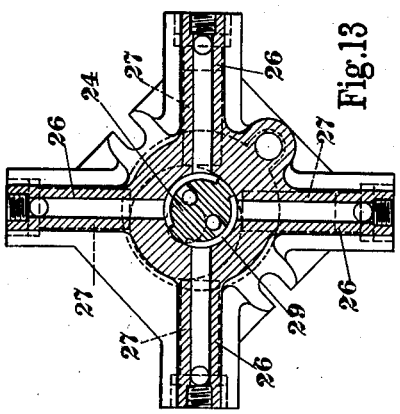
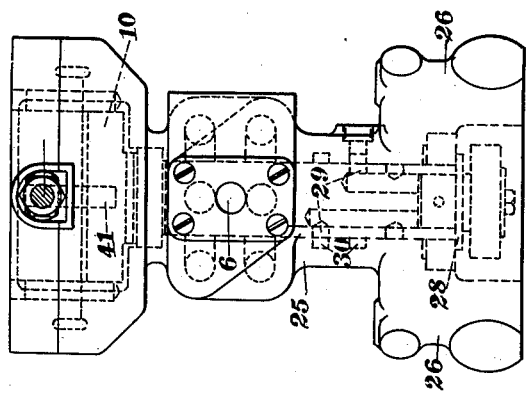
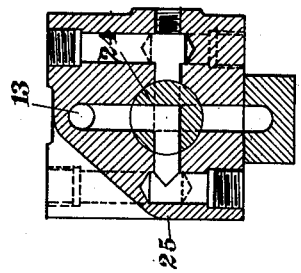
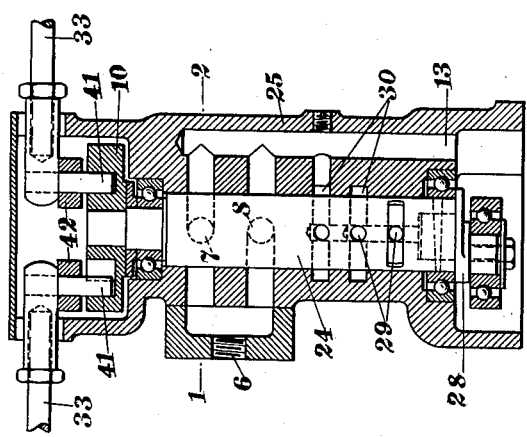
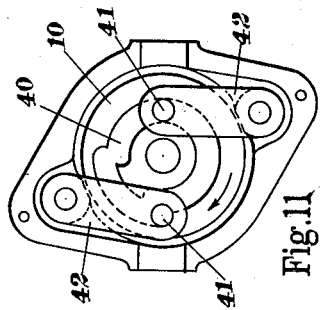

Patented Apr. 1, 1930

1,753,096

UNITED STATES PATENT OFFICE

JOHN WILDSMITH SNARRY, OF HANDSWORTH, BIRMINGHAM, ENGLAND, ASSIGNOR TO THE GEAR GRINDING COMPANY LIMITED, OF BIRMINGHAM, ENGLAND

METAL CUTTING AND GRINDING MACHINE

Application filed October 5, 1926, Serial No. 139,697, and in Great Britain November 13, 1925.

This invention relates to metal cutting and grinding machines of the kind in which a slide is employed for producing relative motion of the tool and work, and in which indexing or like mechanism is employed for intermittently bringing successive portions of the work under the action of the tool. In particular, the invention relates to gear grinding machines in which a revolving grinding wheel is carried on a reciprocatory slide.

The object of the invention is to provide improved hydraulic means for actuating the slide and indexing or other parts.

The invention comprises the employment in conjunction with two or more operating cylinders and pistons, of an automatic control valve or valves, and means acting on the valve or valves for co-ordinating the movements of the pistons.

The invention also comprises the employment of means whereby the working stroke of the piston can be effected at a variable speed, also means whereby the return stroke can be effected at a relatively rapid speed. Also the invention comprises further features hereinafter described.

Further, the invention comprises in a gear wheel or other grinding machine, the employment in conjunction with the hydraulic system for actuating the main slide of the machine, of a branch system controlled by a valve for actuating the wheel trimming mechanism.

In the five accompanying sheets of explanatory drawings:—

Figure 1 is a diagrammatic view showing an application of the invention to a machine for grinding the teeth of gear wheels.

Figure 2 is a side elevation, and Figure 3 an end view of a gear grinding machine constructed in accordance with this invention.

Figure 4 is a sectional side elevation and Figure 5 an end elevation of the slide actuating mechanism. Figure 6 is a sectional side elevation, and Figure 7 a sectional end elevation of the mechanism for actuating the dividing head.

Figure 3:
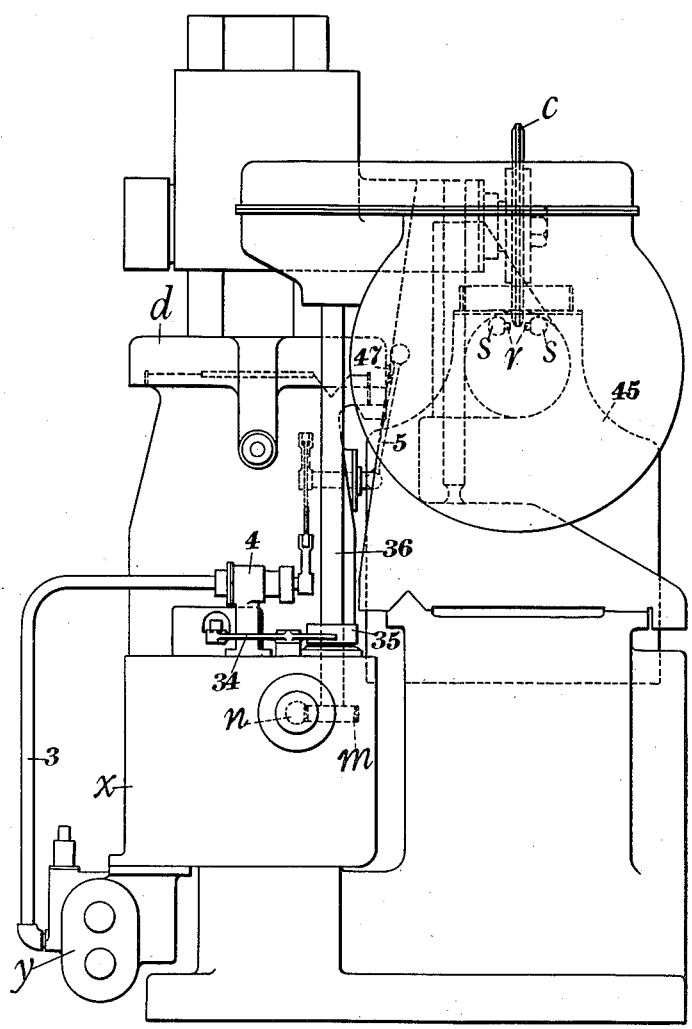

Figure 9 is a sectional side elevation, Figure 10 an end elevation, and Figure 11 a plan of the main valve and the means for actuating the same; Figure 12 is a sectional elevation, and Figure 13 a sectional plan of the valve actuating mechanism, and Figure 14 is a sectional plan on 1, 2. Figure 9.

I will first describe the schematic representation of the invention as shown in Figure 1. The gear, or a plurality of coaxially mounted gears $a$ to be ground is or are carried on the rotatable spindle of a dividing head $b$. The grinding wheel $c$ which has its periphery shaped to pass between each pair of adjacent tooth faces and to grind those faces simultaneously, is carried by a slide $d$ and is preferably rotated by an electric motor (not shown) which is also carried on the slide.

The slide $d$ is reciprocated by a piston or ram $e$ movable in a fixed hydraulic cylinder $f$. The motive fluid is preferably oil, though any other suitable fluid may be used. At the inner end of the ram is formed or provided a piston $g$ which fits the cylinder. The area exposed to the motive fluid at the rear of the piston is smaller than that exposed to the fluid at the front of the piston. With this arrangement, and using a motive fluid of constant pressure, the backwards or return stroke of the piston or ram away from the gears $a$ is effected more rapidly than the forward or operative stroke towards the gears $a$.

The dividing head may be of any suitable form. That illustrated comprises a ratchet disc $h$ to which intermittent angular movements can be imparted by a pawl $i$ which is reciprocated by a slide $j$. The latter receives its motion from a crank $k$ and connecting rod $l$, and the crank is rotated by a pinion $m$ engaged by a rack $n$ which is actuated by the piston or ram $o$ of a hydraulic cylinder $p$. The ram is formed or provided with a piston $q$ and the arrangement is such that the motion in one direction is quicker than that in the opposite direction, though by continuing the ram through the rear end of the cylinder, both strokes may if desired be performed at the same rate.

When the main slide $d$ is at the extreme end of the return stroke, as shown in Figure 1, the grinding wheel or disc c can be subjected to a trimming operation, by means of a diamond as r on a spindle s, arranged at each side of the disc. The spindles are oscillated by any convenient mechanisms from a piston t and rod u in a hydraulic cylinder v.

Oil or other suitable fluid is supplied to the various cylinders from a tank x by a pump y. The fluid is first delivered by the pump along a pipe 3 to the valve 4 which is controlled by the hand lever 5. When it is not required to operate the machine, the valve is turned to the position at which the fluid is returned to the tank x along the pipe 2. To bring the machine into action the valve 4 is rotated to put the pipe 3 into communication with the pipe 6 leading to the automatic control valve. The preferred construction of this valve will be described later, but for the purpose of explanation it is shown in Figure 1 as consisting of two parts, one of which 7 controls the fluid supply to one end of each of the cylinders f and p, whilst the other 8 controls the supply to the other end of each of the said cylinders. The valve parts 7, 8 are secured together and rotatable on a common axis. They are also connected at one end to a fluid operated actuating motor 9 to be described more fully later, and at the other end to an escapement device 10 also to be described more fully later.

In the position of the various parts shown in Figure 1, fluid delivered along the pipe 6 can pass through the valve 8 and pipe 14 to one end of the cylinder f for effecting the return stroke of the same in that cylinder, this stroke being shown completed in the drawing. Meanwhile the valve 7 has occupied the position for exhausting the opposite side of the cylinder along the pipe 37. The next quarter turn of the valves 7, 8, (in the direction of the arrow) allows fluid to pass to one end of the cylinder p along the pipe 11 and to be exhausted from the opposite end through the pipe 12, the pipe 13 serving to return fluid from all cylinders to the tank x. In the next quarter turn, fluid flow to and from the cylinder p is reversed. During the following two quarter turns, the fluid is caused to operate the ram in the cylinder f, whilst that in the cylinder p remains stationary. The cycle of operations is then repeated. It will be seen that whilst the ram of the cylinder f is working, the ram of the cylinder p is stationary, and vice versa.

To vary the speed of operation of the working stroke of the ram in the cylinder f, a by-pass 15 with valve 16 is provided between the pipe 37 and the tank x. When the valve is closed the ram operates at its maximum speed in the forward direction, but when the valve is open no motion is given to the ram. Intermediate conditions are obtained by varying the opening of the valve.

During normal working the ram in the cylinder f is not brought back to the full extent, but the stroke is adjusted so as to be comparable to the length of the wheel faces to be ground. It is, however, necessary at intervals to trim the grinding wheel, and to enable this to be done, the ram is caused to move back to the full extent, until it abuts against the end of the cylinder. In this position the grinding wheel lies between the diamonds above mentioned as shown in Figure 1. While the ram is held firmly against the cylinder end under the pressure of the working fluid, the latter is also admitted by a branch pipe 38 extending from the pipe 14 to the cylinder v through a hand operated valve 17. Reciprocation of the piston t is controlled by a hollow cylindrical valve 18. Starting with the position shown in Figure 1, the fluid has raised the piston to its upper position and caused a corresponding movement of the diamond spindles. Also the tappet 19 acting on a spring controlled lever 20 caused the valve 18 to be moved to the position shown. Pressure fluid is now admitted to the upper side of the piston t and exhausted from the lower side through the discharge pipe 21 to the tank x. When the piston approaches its lower position the tappet 19 reverses the position of the valve 18 and causes pressure fluid to be admitted to the underside of the piston, the other side of the piston being then connected to the pipe 21. The lever 20 acts on the valve through the tappet 22 and is caused to act quickly in either direction of motion, in the well known manner, by the spring 23 when the portion of the lever in engagement with the spring has moved past its central position. The arrangement of the valve and the various parts controlled by it are sufficiently obvious from the drawing and need no further description. The trimming mechanism described forms no part of the present invention and is the subject matter of a concurrent pending application.

After the grinding wheel has been trimmed the slide d is again set in motion, and the normal operation of the machine is continued.

I will now describe the automatic operation of the valves 7 and 8 whereby the properly correlated reciprocations of the rams in the cylinders f and p are effected. As already stated, the valves 7, 8, motor 9 and escapement 10 are all coaxially arranged and connected together. The details of the preferred construction are shown in Figures 9–14. The valves are combined in a single rotating member 24 in which the ports 7, 8 correspond to the valves shown in Figure 1. Fluid is admitted at 6 and exhausted through 13. At the lower end of the valve case 25 are arranged a system of four hydraulic motor cylinders 26, each containing a plunger 27 the inner end of which acts on a crank 28. The admission of fluid to each of the motor cylinders in turn is controlled by ports 29 in the element 24, and all the cylinders exhaust into the passage 13. The ports 29 co-operate with passages 30 in the case 25 to effect the required distribution of fluid. Any convenient arrangement may be employed, and that shown in the drawings is sufficiently clear without further description.

Figure 8:
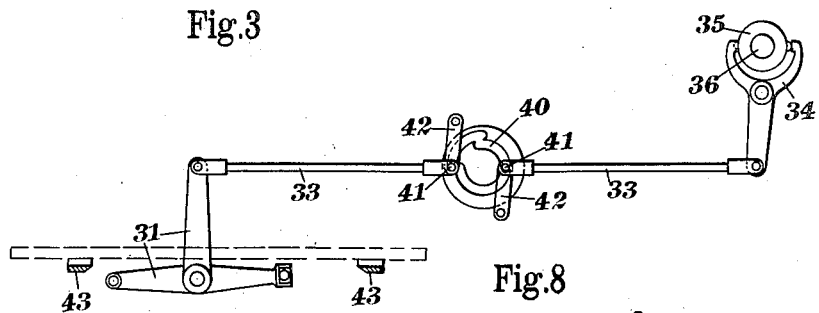
Figure 8 is a plan of the mechanism for controlling the main valve.

The fluid operated motor tends always to rotate the valve 24 in the one direction shown, but this tendency is resisted at suitable intervals by the escapement at the upper end of the valve. In the construction shown, the escapement comprises a disc 10 formed with a specially shaped groove 40 as shown in Figures 1 and 11, and engaging with this groove are a pair of pegs 41 connected to levers 42. One of the levers is actuated by the main slide $d$ of the machine, while the other is actuated by the dividing head mechanism. In the position shown in Figure 1, the disc 10 is prevented from rotation by the engagement of the left hand peg with a shoulder in the groove of the disc. When by the action of the slide $d$ this peg is moved to the right the disc will be released, and the motor 9 will rotate the valve through one quarter of a revolution, when the right hand peg will arrest the disc. The formation of the disc groove and the disposition of the pegs is such that the disc is arrested after each quarter revolution. Starting from the position shown in Figure 1, the first two quarter movements control the ram of the cylinder $p$, and the second two control the ram of the cylinder $f$. The lateral movements of the pegs by the main slide and the dividing head mechanism respectively are effected by the means shown in Figure 8. On the main slide $d$ are adjustably secured a pair of striking pieces 43 and adjacent to the slide is pivoted a lever 31 connected by a link 33 with one of the levers 42. The alternate movements of the corresponding peg 41 are produced by the opposite actions of the striking pieces 43 on the ends of the lever 31. The other peg is similarly actuated by a link 33 connected to a forked lever 34 which can be rocked in either direction by a cam disc 35 secured to spindle 36 of the dividing mechanism which is actuated by the pinion $m$ abovementioned.

The application of the invention to the machine shown in Figures 1–7 will require but little further explanation, as the various parts will be readily identified with those shown in the diagram at Figure 1. The slide $d$ carrying the grinding wheel $c$ is mounted on a horizontal slide forming the upper part of the bed 44 of the machine. In Figure 2 a single wheel $a$ is shown in position on the spindle of the dividing head for treatment by the grinding wheel. The details of the dividing head are not fully illustrated as any convenient construction may be employed. Actually I prefer that described in my British patent specification No. 244,647. Motion is transmitted from the rack $n$ to such mechanism by the pinion $m$ and vertical shaft 36. The actuating mechanism for the trimming tools is contained in the casing 45 shown by dotted lines in Figure 3, and located at the rear side of the machine. The position of the diamond spindles $s$ are shown by dotted lines in Figure 3.

It will be understood that the normal reciprocation of the slide $d$ is controlled by the action of the striking piece 43 on the lever 31. When it is desired to bring the slide back to the limit of its return movement and hold it there for the purpose of carrying out a trimming operation, the attendant moves the right hand projection 46 on the lever 31 clear of the approaching striking piece 43. This allows the ram to continue its motion until arrested by the end of the cylinder. The said projection is made movable and may be controlled by the attendant from the far side of the machine through any convenient device such as a flexible cable (not shown). To prevent excessive impact of the ram against the cylinder end, a projection 47 on the slide is caused to move the hand valve lever 5 and so close or partially close the hand valve 4, thereby shutting off or throttling the supply of pressure fluid to the cylinder. To restart the machine after trimming, the lever 31 is moved by hand to release the escapement, and the projection 46 on the lever is returned to its proper position.

It is desirable in the trimming operation to effect the last stages by a slow motion of the diamonds. In order that the diamonds may be actuated at either of two speeds I form the valve 17 with a pair of passages, one of which is larger than the other. By means of the larger passage a full flow of fluid is obtained giving the higher speed. The smaller passage reduces the flow and so slows down the rate of operation of the trimming mechanism.

The application of the invention to other machines such as milling and shaping machines is essentially the same as that above described, but in all cases the details of the mechanism may be varied to suit different requirements.

Having thus described my invention what I claim as new and desire to secure by Letters Patent is:—

1. A machine of the kind described comprising a plurality of reciprocable members, tool holding and work holding mechanisms alternately operated by said reciprocable members, a plurality of fluid motors for alternately reciprocating said members, one motor for each member, conduit for supplying fluid under pressure alternately to said motors, a rotary distributing valve in said conduit for alternately connecting said motors to reciprocate said members, fluid operated means for rotating said valve and escapement means operable by said members alternately for releasing said valve and permitting its actuation by said fluid operated means.

2. In a metal grinding machine, tool carrying and work holding mechanisms, a plurality of cylinders and fluid operated pistons for operating said mechanisms, a valve to control the fluid for operating the pistons, a fluid operated motor acting on the valve and an escapement for controlling the valve with connections to said pistons whereby the escapement is automatically operated by said pistons and means for supplying fluid under pressure to said cylinders and valve actuating motor, said escapement comprising a rotatable disc having an abutment thereon, said disc being secured to said valve.

3. In a metal grinding machine, work holding and tool carrying mechanisms, a reciprocating member, one for each of said mechanisms for alternately operating the mechanisms, fluid motors for operating said members, means for supplying fluid under pressure to said motors, said means including a one-way rotary valve for controlling the flow of fluid to said motors, a motor for rotating said valve, an escapement for periodically stopping said valve and connections between said escapement and said members for operating said escapement to release the valve and permit its operation by the valve operating motor.

4. In a metal grinding machine, a tool carrying mechanism and a cylinder and fluid operating piston for reciprocating the same, a work holding mechanism and a cylinder and fluid operating piston therein for operating said last mentioned mechanism, a one-way rotary valve to control the fluid for operating the pistons, a fluid operated motor for rotating the valve, an escapement for periodically stopping the rotation of the valve and connections to said pistons whereby the escapement is automatically operated by movement of said pistons for releasing the valve and a pump for supplying fluid under pressure to said cylinder and said valve actuating motor.

5. A metal grinding machine including a plurality of reciprocal members, a plurality of motors for operating said members, one for each of said members, a conduit for supplying fluid under pressure to said motors, a distributing one-way rotary valve in said conduit for controlling the flow of fluid to said motors, a fluid motor for rotating said valve, and an escapement periodically operated by said members for stopping the rotation of the valve and afterwards releasing the same to permit said last mentioned fluid motor to rotate said valve.

6. In a machine of the character described, carriers respectively for work and a tool, fluid operating motors each having a reciprocating element for operating a carrier, a pump for operating said motors, an escapement controlled rotary valve between the pump and motors for controlling the alternate operation of the motors by the pump, means for rotating the valve and connections between said reciprocating elements and the escapement of the valve for operating the escapement and thereby alternately permitting a motor to operate its carrier.

7. A machine as claimed in claim 6, wherein the means for rotating the valve includes a fluid operated motor intermittently connected to the pump through the valve.

In testimony whereof I have signed my name to this specification.

JOHN WILDSMITH SNARRY.